(12) United States Patent
Schuette et al.

(10) Patent No.: US 6,673,734 B1
(45) Date of Patent: Jan. 6, 2004

(54) CRYSTALLINE MICROPOROUS OXIDE CATALYSTS HAVING INCREASED LEWIS ACIDITY AND METHODS FOR THE PREPARATION THEREOF

(75) Inventors: William L. Schuette, deceased, late of New Roads, LA (US), by Darlene Schuette, executrix; Albert E. Schweizer, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/653,136

(22) Filed: Aug. 31, 2000

Related U.S. Application Data

(63) Continuation-in-part of application No. 08/912,047, filed on Aug. 15, 1997, now abandoned, which is a continuation-in-part of application No. 08/493,947, filed on Jun. 23, 1995, now abandoned, which is a continuation-in-part of application No. 08/317,438, filed on Oct. 3, 1994, now abandoned.

(51) Int. Cl.$^7$ .............................................. B01J 29/06
(52) U.S. Cl. ............................. 502/63; 502/64; 502/73; 502/79; 502/85
(58) Field of Search ............................. 502/63, 64, 65, 502/73, 79, 85

(56) References Cited

U.S. PATENT DOCUMENTS

| | | | |
|---|---|---|---|
| 3,013,987 A | 12/1961 | Castor et al. ................ 252/455 |
| 3,354,078 A | 11/1967 | Miale et al. ................. 208/120 |
| 3,607,043 A | * 9/1971 | McDaniel et al. ...... 208/120.01 |
| 3,644,220 A | * 2/1972 | Kearby |
| 4,224,188 A | * 9/1980 | Alafandi et al. ...... 423/DIG. 21 |
| 4,259,175 A | 3/1981 | McArthur .................... 208/113 |
| 4,332,699 A | 6/1982 | Nozemack ................... 252/455 |
| 4,354,049 A | * 10/1982 | Ball et al. .................... 208/135 |
| 4,357,265 A | 11/1982 | Chiang ........................ 252/455 |
| 4,384,161 A | 5/1983 | Huang ......................... 585/722 |
| 4,415,439 A | * 11/1983 | Chiang |
| 4,584,283 A | 4/1986 | Bertus et al. .................. 502/31 |
| 4,624,936 A | 11/1986 | Sato et al. .................... 502/65 |
| 4,664,779 A | 5/1987 | Bertus et al. ................ 208/114 |
| 4,728,629 A | 3/1988 | Bertus et al. .................. 502/62 |
| 4,938,863 A | 7/1990 | Degnan et al. .............. 208/120 |
| 5,059,567 A | 10/1991 | Linsten et al. ................. 502/64 |
| 5,118,482 A | * 6/1992 | Narayana et al. |
| 5,145,817 A | * 9/1992 | Sherrod ........................ 502/65 |
| 5,228,980 A | 7/1993 | Stockwell et al. ........... 208/120 |
| 5,242,677 A | 9/1993 | Cooper et al. ............... 423/714 |
| 5,292,697 A | * 3/1994 | Klotz ............................ 423/12 |
| 5,294,332 A | * 3/1994 | Klotz .......................... 208/113 |
| 5,294,578 A | 3/1994 | Ho et al. ....................... 502/62 |
| 5,376,608 A | 12/1994 | Wormsbecher et al. ....... 502/61 |
| 5,525,210 A | 6/1996 | Wormsbecher et al. ..... 208/122 |
| 5,576,258 A | * 11/1996 | Chamberlain et al. ...... 502/208 |

FOREIGN PATENT DOCUMENTS

| | | | |
|---|---|---|---|
| EP | 134 331 A1 | * 3/1985 | |
| EP | 0286029 A1 | 10/1988 | ........... C07C/85/24 |
| EP | 0321177 A2 | 6/1989 | ........... C01B/33/28 |
| WO | WO 91/11412 | 8/1991 | ............. C07C/2/58 |
| WO | WO 93/02156 | 2/1993 | ........... C10G/35/06 |
| WO | WO 95/33561 | 12/1995 | ............ B01J/37/02 |

OTHER PUBLICATIONS

*Zeolites*, vol. 13, Nov.–Dec. 1993, pp. 684–687.
Corma, et al., *Microporous and Mesoporous Materials*, 35–36, 2000, pp. 21–30.
Adivan, *Recent and Future Developments in FCC*, Akzo Catalysts Symposium, Fluid Catalytic Cracking, 1991, pp. 43–64.

* cited by examiner

*Primary Examiner*—Kiley Stoner
*Assistant Examiner*—Christina Ildebrando
(74) *Attorney, Agent, or Firm*—Michael A. Cromwell; Erika Singleton Wilson

(57) ABSTRACT

A catalyst component, a catalyst, and a process for making the component and catalyst are disclosed herein. Also disclosed herein is a fluid catalytic cracking process for converting petroleum feedstocks to lower boiling products wherein the feedstock is contacted with the catalyst. The catalyst component is a crystalline microporous oxide catalyst to which a compound for promoting dehydrogenation and increasing Lewis acidity is effectively added. This catalyst component can be included in an inorganic oxide matrix material and used as a catalyst. Preferably, the compound for promoting dehydrogenation and increasing Lewis acidity is effectively added to a non-framework portion of the crystalline microporous oxide.

14 Claims, No Drawings

CRYSTALLINE MICROPOROUS OXIDE CATALYSTS HAVING INCREASED LEWIS ACIDITY AND METHODS FOR THE PREPARATION THEREOF

CROSS-REFERENCE TO RELATED APPLICATIONS

This is a continuation-in-part of U.S. patent application Ser. No. 08/912,047 filed Aug. 15, 1997 ABN, which is a continuation of U.S. patent application Ser. No. 08/493,947 filed Jun. 23, 1995 ABN, which is a continuation-in-part of U.S. patent application Ser. No. 08/317,438 filed Oct. 3, 1994 ABN.

BACKGROUND

This invention relates to catalyst components and compositions and methods of making and using the composition which comprises a crystalline microporous oxide having a promoter metal compound that promotes dehydrogenation and increases Lewis acidity without increasing the unit cell size of the crystalline microporous oxide.

Crystalline microporous oxides, such as zeolitic materials, have been in commercial use in a variety of industries for many years. These materials are especially valuable for their fluid separation ability as molecular sieves, as well as for their ability to act as a catalyst.

Crystalline microporous oxides are particularly useful as catalysts which convert the large paraffin molecules of a hydrocarbon mixture into smaller more unsaturated molecules such as olefins and aromatics. Typical conversion processes include fluid catalytic cracking and hydrocracking. To maximize this conversion process, many structural properties of the catalyst have to be balanced, such as pore size, pore volume, Lewis acidity, and Brønsted acidity. If the structural properties of the conversion catalyst are not properly balanced, conversion of the hydrocarbon mixture to product may be low, product quality may be poor, or the conversion catalyst may be rapidly deactivated.

It would be of particular benefit to obtain a crystalline microporous oxide catalyst high in catalytic activity by balancing the Brønsted acidity and the Lewis acidity of the framework and non-framework portions of the catalyst. By balancing the composition of the framework and non-framework portions of the crystalline structure, catalytic activity can be efficiently optimized. In the case of a cracking catalyst, olefin forming reactions of large paraffin molecules can be more efficiently coupled with the subsequent scission reactions which form the smaller molecules in the final product.

SUMMARY

One embodiment of the present invention comprises a catalyst comprising (i) a matrix material, and (ii) a crystalline microporous oxide incorporated into/with the matrix material. The crystalline microporous oxide comprises a non-framework portion and has a unit cell size. The non-framework portion comprises a promoter metal compound incorporated only into the non-framework portion of the crystalline microporous oxide. The promoter metal compound does not substantially increase the unit cell size of the crystalline microporous oxide.

In another embodiment of the catalyst, the crystalline microporous oxide comprises a Y zeolite incorporated into the matrix material. The Y zeolite comprises a non-framework portion, has a unit cell size greater than about 24.30 Å, and comprises aluminum oxide incorporated only into the non-framework portion of the crystalline microporous oxide, such that the aluminum oxide increases Lewis acidity but does not substantially increasing the unit cell size of the zeolite.

In another embodiment of the catalyst, the crystalline microporous oxide comprises a non-framework portion comprising a promoter metal compound capable of increasing Lewis acidity incorporated only into the non-framework portion of the crystalline microporous oxide, such that the promoter metal compound does not substantially increase the unit cell size of the crystalline microporous oxide.

The embodiments of the catalyst can be used in an FCC unit, an isomerization unit, or a hydrocracker by contacting the catalyst with a suitable feedstock.

Another embodiment of the present invention comprises a process for making a catalyst. The process comprises (a) contacting a crystalline microporous oxide and a promoter precursor comprising a promoter metal capable of forming a promoter metal compound, said crystalline microporous oxide comprising a non-framework portion and having a unit cell size; and, (b) heating the mixture of step (a) to a temperature between 150° C. and 550° C.; wherein a promoter metal compound comprising said promoter metal is incorporated only into the non-framework portion of the crystalline microporous oxide and wherein the promoter metal compound does not substantially increase the unit cell size of the crystalline microporous oxide.

Another embodiment of the present invention is a process comprising: (a) contacting a crystalline microporous oxide and a promoter precursor, the crystalline microporous oxide comprising a non-framework portion and having a unit cell size and the promoter precursor comprising a promoter metal capable of forming a promoter metal compound; (b) decomposing said promoter precursor thereby forming a promoter metal compound comprising an oxide form of said promoter metal; (c) dispersing said promoter metal compound only into the non-framework portion of said crystalline microporous oxide; wherein the promoter metal compound does not substantially increase the unit cell size of the crystalline microporous oxide.

Another embodiment of the present invention is a process comprising: (a) calcining a zeolite comprising a non-framework portion and having a unit cell size; (b) contacting the zeolite with a promoter precursor comprising a promoter metal capable of forming a promoter metal compound, wherein said promoter metal is selected from the group consisting of magnesium, chromium, iron, lanthanum, gallium, manganese and aluminum and wherein said promoter precursor is selected from the group consisting of aluminum acetylacetonate, aluminum isopropyloxide, aluminum hexafluoroacetylacetonate, aluminum dichlorohydrol, aluminum ethoxides, tris[2,2,6,6-tetramethyl-3-5,heptanedianoto]aluminum-III[Al(TMHD)$_3$], aluminum acetate, aluminum nitrate, aluminum propoxide, magnesium acetylacetonate, chromium acetylacetonate, iron acetylacetonate, gallium acetylacetonate, manganese acetylacetonate, and lanthanide acetylacetonate; (c) heating the mixture of step (b) to a temperature between 150° C. and 550° C.; (d) incorporating the product of step (b) into a matrix material, wherein a promoter metal compound comprising said promoter metal is incorporated only into the non-framework portion of the zeolite and wherein the promoter metal compound does not substantially increase the unit cell size of the zeolite.

Another embodiment of the present invention is a process comprising: (a) contacting a calcined crystalline microporous oxide and a promoter precursor comprising a promoter metal capable of forming a promoter metal compound, said crystalline microporous oxide comprising a non-framework portion and having a unit cell size; and, (b) activating said promoter metal compound, wherein said promoter metal compound is incorporated only into the non-framework portion of the crystalline microporous oxide and wherein the promoter metal compound does not substantially increase the unit cell size of the crystalline microporous oxide.

Another embodiment of the present invention is a process comprising: (a) calcining a crystalline microporous oxide, the crystalline microporous oxide comprising a non-framework portion and having a unit cell size; (b) contacting an aluminum alkyl selected from the group consisting of trimethylaluminum, triethylaluminum, tri(t-butyl) aluminum, and tri(i-butyl)aluminum; (c) treating the product of step (b) with an oxygen-containing material to form a promoter metal compound, wherein the promoter metal compound does not substantially increase the unit cell size of the crystalline microporous oxide.

Other embodiments of the present invention include the products produced by the processes of the present invention. These products may or may not be incorporated into a matrix material, but are preferably incorporated into a matrix material before used in a process unit.

DETAILED DESCRIPTION

The catalytic activity of a crystalline microporous oxide, such as a zeolite, can be improved by effectively incorporating a promoter metal compound that promotes dehydrogenation and increases Lewis acidity of the crystalline microporous oxide without increasing its unit cell size. Although the crystalline microporous oxide can be used as a catalyst alone, the crystalline microporous oxide is preferably incorporated into a matrix material, preferably an inorganic oxide. Other catalytic or non-catalytic components can also be present in the matrix material.

The crystalline microporous oxide of this invention can be used to catalyze the breakdown of primary products from the catalytic cracking reaction into clean products such as naphtha for fuels and olefins for chemical feedstocks. The crystalline microporous oxide is preferably selected from the group consisting of crystalline aluminosilicate zeolites (hereafter zeolites), tectosilicates, tetrahedral aluminophosphates (ALPOs) and tetrahedral silicoaluminophosphates (SAPOs). More preferably, the crystalline microporous oxide is a zeolite.

Suitable zeolites include both natural and synthetic zeolites. Suitable natural zeolites include gmelinite, chabazite, dachiardite, clinoptilolite, faujasite, heulandite, levynite, erionite, cancrinite, scolecite, offretite, mordenite, and ferrierite. Suitable synthetic zeolites are zeolites X, Y. L, ZK-4, ZK-5, E, H, J, M, Q, T, Z, alpha and beta, ZSM-types and omega. Faujasites are preferred, particularly zeolite Y and zeolite X having a unit cell size greater than or equal to 24.30 Å, more preferably greater than or equal to about 24.40 Å. The aluminum in the zeolite, as well as the silicon component, can be substituted for other framework components. For example, the aluminum portion can be replaced by boron, gallium, titanium or trivalent metal compositions which are heavier than aluminum. Germanium can be used to replace the silicon portion.

In a finished catalyst product, the crystalline microporous oxide is preferably included within an inorganic oxide matrix material that binds the catalyst components together so that the final catalyst is hard enough to survive interparticle and reactor wall collisions. An inorganic oxide matrix material can be made from an inorganic oxide sol or gel which is dried to "glue" the catalyst components together. Preferably, the inorganic oxide matrix material comprises oxides of silicon and aluminum. The inorganic oxide matrix material can further comprise an active porous inorganic oxide catalyst component and an inert catalyst component. Preferably, each component of the catalyst is held together by attachment with the inorganic oxide matrix material.

An active porous inorganic oxide catalyst component typically catalyzes the formation of primary products by cracking hydrocarbon molecules that are too large to fit inside the crystalline microporous oxide. An active porous inorganic oxide catalyst component which can be incorporated into the cracking catalyst is preferably a porous inorganic oxide that cracks a relatively large amount of hydrocarbons into lower molecular weight hydrocarbons as compared to an acceptable thermal blank. A low surface area silica (e.g., quartz) is one type of acceptable thermal blank. The extent of cracking can be measured in any of various ASTM tests such as the MAT (microactivity test, ASTM #D3907-8). Compounds such as those disclosed in Greensfelder, B. S., et al., *Industrial and Engineering Chemistry*, pp. 2573–83, Nov. 1949, are desirable. Alumina, silica-alumina and silica-alumina-zirconia compounds are preferred.

An inert catalyst component typically densifies, strengthens and acts as a protective thermal sink. An inert catalyst component which can be incorporated into the cracking catalyst of this invention preferably has a cracking activity that is not significantly greater than the acceptable thermal blank. Kaolin and other clays as well as $\alpha$-alumina, titania, zirconia, quartz and silica are examples of suitable inert components.

The discrete alumina phases are preferably incorporated into the inorganic oxide matrix material. Species of aluminum oxyhydroxides-$\gamma$-alumina, boehmite, diaspore, and transitional aluminas such as $\alpha$-alumina, $\beta$-alumina, $\gamma$-alumina, $\delta$-alumina, $\epsilon$-alumina, $\kappa$-alumina, and $\rho$-alumina can be employed. Preferably, the alumina species is an aluminum trihydroxide such as gibbsite, bayerite, nordstrandite, or doyelite.

In one embodiment of the present invention, the crystalline microporous oxide catalyst component includes a compound for promoting dehydrogenation and increasing Lewis acidity, referred to herein as a promoter metal compound. The dispersal of the promoter metal compound into the crystalline microporous oxide does not result in any substantial increase in the unit cell size of the crystalline microporous oxide, and the unit cell size of the crystalline microporous oxide material is substantially the same.

The promoter metal compound is preferably in a chemical state to effectively promote the dehydrogenation of paraffinic and naphthenic compounds in a hydrocarbon feed stream to form olefinic compounds. For example, aluminum oxide ($Al_2O_3$), comprises a suitable promoter metal (aluminum). The oxide of aluminum is in such an effective chemical state.

The crystalline microporous oxide includes a framework portion and a non-framework portion. Lewis acidity of the crystalline microporous oxide is increased by increasing the number of effective metal cation sites of the non-framework portion of the crystalline microporous oxide without increasing the unit cell size. Typically, when a material is incorporated into the framework portion of the material the unit cell size will be increased. When the promoter metal compounds of the present invention are incorporated into the crystalline micorporous oxide material of the present invention, the unit cell size remains substantially the same. Thus, the promotor materials are preferably incorporated only into the non-framework portion of the crystalline microporous oxide material. Cf., W. O. Haag, "Catalysis by Zeolites—Science and Technology", *Zeolites and Related Microporous Materials*, edited by J. Weitkamp, H.G. Karge, H. Pfeifer, and W. Holderich, Vol. 84, Elsevier Science B.V., 1994, with pp. 1375–1394 being incorporated herein by reference, which discusses the relevance of Lewis acid sites. As used herein, metal cation refers to either a metal ion or the metal ion plus oxide ion species.

One embodiment of the present invention is a process for making an activated catalytic component. Other embodiments are the activated catalytic component produced by the process and a final catalyst product that includes a matrix material.

One embodiment of the processes of the present invention comprises contacting, by mixing or by other suitable methods, a crystalline microporous oxide and a promoter precursor capable of forming a promoter metal compound. As used herein, mixing means combining components and does not necessarily require any mechanical agitation. Contacting the promoter precursor with the crystalline microporous oxide causes the promoter precursor to disperse within the non-framework portion of the crystalline microporous oxide. The promoter metal compound is then activated, preferably by decomposing the promoter precursor, resulting in a residual organic portion and a promoter metal compound sorbed or dispersed into the non-framework portion of the crystalline microporous oxide. To increase the effective number of metal cation non-framework acid sites, the promoter metal compound sorbs to the crystalline microporous oxide by a liquid or gas phase reaction, such as vapor phase transfer.

The promoter precursor and crystalline microporous oxide are contacted for an amount of time sufficient for the crystalline microporous oxide to retain between 40 and 60 wt %, preferably about 50 wt %, of the promoter metal oxide resulting from decomposition of the promoter precursor. The degree of retention can be measured by measuring the weight of the crystalline microporous oxide/promoter precursor mixture during the activation/heating step. The crystalline microporous oxide and promoter precursor are mixed in a weight ratio of crystalline microporous oxide:promoter precursor is between 100:15 to 100:200, preferably 100:15 to 100:100. For example, in an embodiment contacting a zeolite and aluminum acetylacetonate, the aluminum acetylacetonate will yield about 15.7% $Al_2O_3$ upon decomposition/reaction. Assuming that about 55 wt % of the $Al_2O_3$ from the aluminum acetylacetonate disperses into the non-framework portion of the zeolite upon decomposition/reaction and is retained by the zeolite, to get 15 grams of $Al_2O_3$ onto 100 grams of zeolite (15% $Al_2O_3$ added), 100 grams of zeolite are mixed with about 175 grams of aluminum acetylacetonate:

(15 g. $Al_2O_3$/(0.157 $Al_2O_3$/aluminum acetylacetonate×0.55(percent decomposition)))=173.4 grams aluminum acetylacetonate.

The residual organic portion may be removed by contacting it with a suitable oxygen containing gas to combust the organic portion. Other suitable methods known in the art are also acceptable.

The promoter metal compound is preferably multivalent metal compound. Preferably, the multivalent metal compound is a compound containing a di-valent or tri-valent metal, preferably selected from the group consisting of magnesium, chromium, iron, lanthanum, gallium, manganese and aluminum.

Preferably, the promoter precursor is stable in the gas phase and preferably has a boiling point less than about 550° C., more preferably less than about 500° C. Examples of preferred promoter precursors include, but are not limited to, aluminum acetylacetonate, aluminum isopropyloxide, aluminum hexafluoroacetylacetonate, aluminum dichlorohydrol, aluminum ethoxides, tris[2,2,6,6-tetramethyl-3-5, heptanedianoto]aluminum-III[Al(TMHD)$_3$], aluminum alkyls such as trimethyl aluminum, triethyl aluminum, and triisobutyl aluminum, aluminum acetate, aluminum nitrate, aluminum propoxide, gallium acetylacetonate, manganese acetylacetonate, magnesium acetylacetonate, chromium acetylacetonate, iron acetylacetonate, and lanthanide acetylacetonate.

In one specific embodiment, the crystalline microporous oxide is preferably calcined by methods known in the art before contacting it with a promoter precursor that may include, but is not limited to aluminum acetylacetonate, aluminum isopropyloxide, aluminum hexafluoroacetylacetonate, aluminum dichlorohydrol, aluminum ethoxides, tris[2,2,6,6-tetramethyl-3-5, heptanedianoto]aluminum-III[Al(TMHD)$_3$], aluminum acetate, aluminum nitrate, aluminum propoxide, magnesium acetylacetonate, chromium acetylacetonate, iron acetylacetonate, manganese acetylacetonate, gallium acetylacetonate, and lanthanide acetylacetonate, which upon activation, form the promoter metal compounds.

The promoter metal compound is activated by heating the crystalline microporous oxide/promoter precursor mixture to between about 150° C. and about 550° C. The heating step decomposes the promoter precursor into a residual organic portion and a promoter metal compound that is dispersed in the non-framework portion of the crystalline microporous oxide. The resulting activated crystalline microporous oxide catalyst component can then be combined with a suitable matrix material and used as a catalytst. In this embodiment the preferred promoter precursors include In one embodiment, the crystalline microporous oxide is a zeolite, preferably Y zeolite, and the promoter precursor is aluminum acetylacetonate, resulting in an aluminum oxide promoter metal compound of aluminum oxide.

In another specific embodiment, the crystalline microporous oxide is preferably calcined by methods known in the art before contacting it with the promoter precursor comprising an aluminum alkyl. Suitable aluminum alkyls include, but are not limited to trimethylaluminum, triethylaluminum, tri(t-butyl)aluminum, tri(i-butyl) aluminum. In this embodiment, the promoter metal compound is activated by contacting the crystalline microporous oxide/promoter precursor mixture with an oxygen containing material. Suitable oxygen containing materials include, but are not limited to air, oxygen gas, water, and alcohols such as methyl alcohol, ethyl alcohol, isopropyl alcohol, and butyl alcohol. The oxygen-containing material reacts with the aluminum alkyl, thereby activating the promoter metal compound by forming aluminum oxide and a residual organic portion. The reaction step decomposes the promoter precursor into a promoter metal compound that is dispersed in the non-framework portion of the crystalline microporous oxide and into a residual organic portion that can be removed if necessary as described above. The resulting activated crystalline microporous oxide catalyst component can then be combined with a suitable matrix material and used as a catalytst. Preferably, the promoter metal comprises aluminum and the crystalline microporous oxide comprises a zeolite.

The product of the process of the preceeding paragraph comprising crystalline microporous oxide material and promoter metal compound incorporated into the non-framework portion of the crystalline microporous oxide material can be added to an inorganic oxide matrix material as described above to form a catalyst, preferably to form a fresh non-contaminated catalyst. The catalyst is then passed to a process unit for suitable use as described below.

The matrix material may constitute the balance of the final catalyst composition, although other catalyst components and materials can be incorporated into the catalyst. Preferably, the matrix material comprises about 40 to about 99 wt %, more preferably from about 50 to about 80 wt % of the catalyst based on the total catalyst weight. It is also within the scope of the invention to incorporate into the catalyst other types of microporous oxides, clays, and carbon monoxide oxidation promoters. The catalyst of the present invention is preferably fresh when passed into the cracking process, that is, it is substantially free from the metals that may contaminate the catalyst during a catalytic cracking process. Such metals include but are not limited to, nickel, vanadium, sodium and iron.

The catalysts of the present invention can be used is various petroleum and chemical processes, particularly those in which dehydrogenation of paraffins is desired. For example, they can be used to catalyze reactions in fluid catalytic cracking, hydrocracking, and isomerization. The promoter metal compound sorbs to the crystalline microporous oxide portion of the catalyst in such a manner as to promote the dehydrogenation of paraffins and naphthenes. Preferably, large paraffins are converted to olefins as a result of the paraffins having contacted the crystalline microporous oxide. The olefins are then preferably converted into smaller paraffin molecules, olefinic molecules, and aromatic molecules in ratios desired for fuels products.

Fluid catalytic cracking is used to convert high boiling petroleum oils to more valuable lower boiling products, including gasoline and middle distillates, such as kerosene, jet fuel and heating oil. Typical feeds to a catalytic cracker have a high boiling point an include residuum, either on its own, or mixed with other high boiling fractions. The most common feeds are gas oils with an initial boiling point usually above about 230° C., more commonly above about 350° C., with end points of up to about 620° C. Typical gas oils include straight run (atmospheric) gas oil, vacuum gas oil, and coker gas oils. As appreciated by those of ordinary skill in the art, such hydrocarbon fractions are difficult to precisely define by initial boiling point since there are so many different types of compounds present in a petroleum hydrocarbon fraction. Hydrocarbon fractions in this range include gas oils, thermal oils, residual oils, cycle stocks, topped and whole crudes, tar sand oils, shale oils, synthetic fuels, heavy hydrocarbon fractions derived from coking processes, tar, pitches, asphalts, and hydrotreated feed stocks derived from any of the foregoing.

Fluid catalytic cracking units will typically contain a reactor where the feedstock contacts a hot powdered catalyst heated in a regenerator. Transfer lines connect the two vessels for moving catalyst particles back and forth. The cracking reaction will preferably be carried out at a temperature from about 450° to about 680° C., more preferably from about 480° to about 560° C.; pressures from about 5 to 60 psig, more preferably from about 5 to 40 psig; contact times (catalyst in contact with feed) of about 0.5 to 15 seconds, more preferably about 1 to 6 seconds; and a catalyst to oil ratio of about 0.5 to 10, more preferably from about 2 to 8.

During the cracking reactions, lower boiling products are formed and some hydrocarbonaceous material and non-volatile coke are deposited on the catalyst particles. The hydrocarbonaceous material is removed by stripping the catalyst, preferably with steam. The non-volatile coke is typically comprised of highly condensed aromatic hydrocarbons. As hydrocarbonaceous material and coke build up on the catalyst, the activity of the catalyst for cracking and the selectivity of the catalyst for producing gasoline blending stock are diminished. The catalyst particles can recover a major proportion of their original activity by removing most of the hydrocarbonaceous material by stripping and removing the coke by a suitable oxidative regeneration. Consequently, the catalyst particles are sent to a stripper and then to a regenerator.

Catalyst regeneration is accomplished by burning the coke deposits from the catalyst surface with an oxygen-containing gas such as air. Catalyst temperatures during regeneration may range from about 560° C. to about 760° C. The regenerated catalyst particles are then transferred back to the reactor via a transfer line and, because of their heat, are able to maintain the reactor at the temperature necessary for the cracking reactions. Coke burn-off is an exothermic reaction; therefore, in a conventional fluid catalytic cracking unit with conventional feeds, no additional fuel needs to be added. The feedstocks used in the practice of the present invention, primarily because of their low levels of aromatics, and also due to the relatively short contact times in the reactor or transfer line, may not deposit enough coke on the catalyst particles to achieve the necessary temperatures in the regenerator. Therefore, it may be necessary to use an additional fuel to provide increased temperatures in the regenerator so the catalyst particles returning to the reactor are hot enough to maintain the cracking reactions. Non-limiting examples of suitable additional fuel include $C_2$- gases from the catalytic cracking process itself, natural gas, and torch oil. The $C_2$- gases are preferred.

Isomerization is another process in which the catalysts of the present invention can be used. Hydrocarbons which may be isomerized by the process of the present invention include paraffinic and olefinic hydrocarbons typically having 4–20, preferably 4–12, more preferably about 4–6 carbon atoms; and aromatics such as xylene. The preferred chargestock is comprised of paraffinic hydrocarbons typified by butanes, pentanes, hexanes, heptanes, etc. Isomerization conditions include temperatures from about 80° C. to about 350° C., preferably from about 100° C. to 260° C.; a pressure from about 0 to 1,000 psig, preferably from about 0 to 300 psig; a liquid hourly space velocity of about 0.1 to 20, preferably about 0.1 to 2; and a hydrogen rate, in standard cubic feet per barrel of about 1,000 to 5,000, preferably from about 1,500 to 2,500. Operating temperatures and catalyst activity are correlated with space velocity to give reasonably rapid processing of the feedstock at catalyst deactivation rates which insure maximum on-stream time of the catalyst between periods of regeneration.

The catalysts of the present invention may also be used in hydrocracking processing. Hydrocracking increases the overall refinery yield of quality gasoline-blending components. Hydrocracking can take a relatively low-quality gas oil feed that otherwise would be blended into distillate fuel and converts it, in the presence of hydrogena and an appropriate catalyst in fixed-bed reactors. Typically, the feedstock is mixed with hydrogen vapor, heated to about 140° C. to 400° C., pressurized to about 1,200 to 3,500 psi, and charged to a first-stage reactor where about 40 to 50% of the feedstock reacts to remove nitrogen and sulfur compounds that inhibit the cracking reactions and make lower quality products. The stream from the first stage is cooled, liquefied, and run through a separator where butanes and lighter gases are taken off. The bottoms fraction is passed to a second-stage reactor a cracked at higher temperatures and pressures wherein additional gasoline-blending components and a hydrockrackate are produced.

The invention will be further understood by reference to the following Examples that illustrate embodiments of the invention.

EXAMPLE 1

Standard MAT tests (e.g., microactivity test, ASTM #D3907-8) were run on three separate commercially available crystalline microporous oxides: USY (obtained from W.R. Grace, Davison Division, as Z14USY or UOP as LZY 82 or LZY 84); LZ-210 (available from Katalystiks, Inc.); and calcined rare earth exchanged Y (CREY, available from W.R. Grace, Davison Division). Prior to running the MAT test, the crystalline microporous oxides were combined with matrix material (Ludox, available from DuPont) and steamed at 1400° F for 16 hours to produce a cracking catalyst. Each catalyst tested comprised 20 wt % zeolite and 80 wt % matrix material. The results are indicated in Table 1 below.

TABLE 1

| MAT Results | USY | LZ-210 | CREY |
| --- | --- | --- | --- |
| conversion (wt %, 400° F. minus) | 42.5 | 47.7 | 64.1 |
| $H_2$ (wt %) | 0.0113 | 0.0186 | 0.0064 |
| C (wt %) | 1.480 | 1.891 | 1.760 |
| Surface Area (m$^2$/g) | 200 | 189 | 130 |
| Pore Volume (cm$^3$/g) | 0.439 | 0.023 | 0.254 |
| Unit Cell (Å) | 24.21 | 24.24 | 24.51 |

EXAMPLE 2

The crystalline microporous oxides of EXAMPLE 1 were metal ion exchanged according to the method of cation exchange in zeolites as described in A. Dyer, *An Introduction to Zeolite Molecular Sieves*, Chapter 6, "Zeolites as Ion Exchangers", John Wiley & Sons, 1988, which chapter is incorporated herein by reference. After the crystalline microporous oxides were ion exchanged, they were combined with matrix material and steamed as in EXAMPLE 1, and run according to a standard MAT test. The results are shown in Table 2.

TABLE 2

| MAT Results | USY + $Al_2O_3$ | LZ-210 + $Al_2O_3$ | CREY + $Al_2O_3$ |
| --- | --- | --- | --- |
| conversion (wt %, 400° F. minus) | 29.8 | 38.5 | 51.1 |
| $H_2$ (wt %) | 0.0047 | 0.0055 | 0.0056 |
| C (wt %) | 1.119 | 1.737 | 1.516 |
| Surface Area (m$^2$/g) | 194 | 172 | 161 |
| Pore Volume (cm$^3$/g) | 0.346 | 0.314 | 0.318 |
| Unit Cell (Å) | 24.25 | 24.22 | 24.36 |

The results indicate that the metal ion exchanged crystalline microporous oxides have a significant reduction in conversion to product compared to the non-exchanged crystalline microporous oxides of EXAMPLE 1. This indicates that the metal ion exchange procedure results in the loss of effective metal cation sites of the non-framework portion of the crystalline microporous oxides in that the balance between Brønsted sites and Lewis sites is not favorable for the desired activity.

EXAMPLE 3

Standard MAT tests were run on three separate commercially available crystalline microporous oxides: rare earth exchanged CREY (RECREY) made by exchanging a portion of the CREY of Example 1 with a rare earth ion solution by the method of Dyer; hydrogen calcined rare earth exchanged Y (HCREY) made by exchanging the approximately 4 wt % $Na^+$ of the CREY with $NH_4^+$ according to the method of Dyer; and ultrastabilized calcined exchanged rare earth Y (USCREY) made by calcining $NH_4CREY$ according to the method described in references 6–13 of R. Szostak, "Modified Zeolites" (Chapter 5), *Introduction to Zeolite Science and Practice*, Vol. 58, Ed. by H. Van Bekkum, E. M. Flanigan, and J. C. Jansen, Elsevier, 1991. Prior to running the MAT test, the zeolites were combined with matrix material (10 wt % zeolite; 30 wt % $SiO_2$ as IMSIL-A-8, available from Unimin Specialty Minerals, Inc.; 60 wt % $SiO_2$—$Al_2O_3$ made from a gel obtained from W.R. Grace, Davison Division, which gives a 25 wt % $Al_2O_3$, $SiO_2$—$Al_2O_3$ when dried and washed) to produce a cracking catalyst. The results are indicated in Table 3.

TABLE 3

| MAT Results | RECREY | HCREY | USCREY |
| --- | --- | --- | --- |
| conversion (wt %, 430° F. minus) | 45.3 | 50.1 | 44.0 |
| C (wt %) | 1.34 | 1.39 | 1.33 |
| 650° F. + prod. (wt %) | 32.4 | 27.4 | 32.7 |
| Surface Area (m$^2$/g) | 101 | 129 | 113 |
| Unit Cell (Å) | 24.49 | 24.45 | — |

Each of the crystalline microporous oxides of EXAMPLE 3 was blended in a separate container with aluminum acetylacetonate (ratio of zeolite to aluminum acetylacetonate approximately 1:1.4; decomposition temperature of aluminum acetylacetonate slightly greater than 320° C.). Each container was placed in an oven and heated to 150° C., held for one hour, and the oven was purged with an amount of nitrogen sufficient to flush out the potentially flammable decomposition products of the acetylacetone decomposition. After purging, the oven was heated to 500° C., held for one hour, and allowed to cool. The oven was then heated in air for 2 hours at 500° C. Based on the weight of the product, it was calculated that about 45 wt % of the alumina expected from the amount of aluminum acetylacetonate remained with the zeolite as a result of the addition process. The zeolite containing the added alumina was then made into catalyst as in Example 3 and then run under standard MAT conditions. The results are shown in Table 4.

TABLE 4

| MAT Results | RECREY + $Al_2O_3$ | HCREY + $Al_2O_3$ | USCREY + $Al_2O_3$ |
| --- | --- | --- | --- |
| conversion (wt %, 430° F. minus) | 55.2 | 58.2 | 60.8 |
| C (wt %) | 1.63 | 1.57 | 1.65 |
| 650° F. + prod. (wt %) | 22.6 | 19.3 | 17.4 |

TABLE 4-continued

| MAT Results | RECREY + $Al_2O_3$ | HCREY + $Al_2O_3$ | USCREY + $Al_2O_3$ |
|---|---|---|---|
| Surface Area (m²/g) | 118 | 81 | 143 |
| Unit Cell (Å) | — | 24.43 | 24.46 |

The results indicate that the crystalline microporous oxides which contain the added metal compound for promoting dehydrogenation and Lewis acidity show a significant increase in conversion to gasoline product compared to the non-metal added crystalline microporous oxides of EXAMPLE 3. This indicates that the addition of the metal compound increased the number of effective metal cation sites of the non-framework portion of the crystalline microporous oxide. In other words, addition of the metal compound resulted in a significant increase in Lewis acid sites. This is also shown in Table 5 below by direct determination of the number of acidic sites per gram of catalyst.

If after steaming as in Example 3 hereof, pyridine is adsorbed onto the catalysts, then heated to 250° C. under vacuum to desorb any pyridine from the more weakly acidic at non-acidic sites, infrared spectroscopy can be used to measure the relative amounts of pyridine adsorbed as the pyrindinium ion onto Brønsted acidic sites, and the amount sorbed as coordinated pyridine on the strong Lewis sites. When this is done on the catalysts as desorbed, the following band intensities of the adsorbed pyridine on the three catalysts is observed.

In Table 5 there are three different materials: 1) RECREY, a rare-earth exchanged zeolite of the FAU structure type. This is the starting material for the next two samples of this table. 2) RECREY+added alumina -I, is a sample of the RECREY to which alumina has been added by the methods taught herein, as effective added alumina. 3) RECREY+ added alumina -II, is a sample of the RECREY to which alumina has been added in a way that is not effective as additional Lewis acid.

The methods taught by R. J. Gorte, et al, [*Journal of Catalysis* 148, 213–223 (1994), and referenced therein] and G. L. Price, et al. [*Journal of Catalysis* 148, 228–236, (1994)] are used to quantitatively determine the total acidity, characterized as both the amount of strongly acid sites (strong enough to effect n-propylamine to decompose to propylene and ammonia upon thermal desorption) and weakly acid sites (acidic because it will interact with n-propylamine at 50° C. to retain the amine, but will desorb the n-propylamine as the temperature is raised). This determination measures both the Brønstad and Lewis acid sites. The measure of acidity is expressed as milliequivalents of acid per gram of material (each millimole of amine is counted as reacting with one millimole of acid sites).

TABLE 5

|  | RECREY | RECREY + Added $Al_2O_3$ | RECREY + Added $Al_2O_3$ |
|---|---|---|---|
| Total Al2O3 (wt. %) | 19.7 | 30.5 | 27.0 |
| Strong Acidity, MEQV/G | 0.46 | 0.38 | 0.40 |
| Weak Acidity, MEQV/G | 2.64 | 2.99 | 2.59 |
| Total Acidity, MEQV/G | 3.10 | 3.37 | 2.99 |

Table 5 shows that only in the case of the effectively added alumina (I) is the weak acidity increased, along with the total acidity. The other example (II) shows that simply increasing the amount of alumina does not necessarily increase the acidity.

Each of the zeolite samples described above are used to prepare catalysts as described in Example 3, and then these composite catalysts are steamed to deactivate them at the same conditions described in Example 3.

A portion of each catalyst sample was then pressed into a thin disk. Each disk was weighed and its' diameter and thickness measured. Each disk was then placed in a vacuum chamber and heated to remove any water or other sorbed gases. It was then cooled to 50° C. and exposed to pyridine vapor for a short period. The sample was then held in vacuum for several hours and its infrared spectrum obtained, particularly between 1400 $cm^{-1}$ and 1600 $cm^{-1}$. The sample was then heated to 250° C. and held for several hours, and the spectrum was again obtained. This increased temperature and high vacuum removed any pyridine that was physically sorbed.

The infrared spectrum between 1400 $cm^{-1}$ and 1600 $cm^{-1}$ was measured on the material before the pyridine sorption and the spectrum was subtracted from the spectrum of the sample containing the pyridine. The resulting spectrum was that due to the pyridine interacting with the acidic sites of the catalyst.

In this spectral region, peaks at 1540 $cm^{-1}$ to 1550 $cm^{-1}$ were assigned to the pyridine that is coordinated to the protons from Brønsted acid sites. Peaks between 1440 $cm^{-1}$ to 1460 $cm^{-1}$ were assigned to pyridine with which the pair of electrons on the nitrogen were interacting with the electron accepting sites (Lewis Acids) of the solid. In this spectral region 1440 $cm^{-1}$ to 1660 $cm^{-1}$ other bands between 1480 $cm^{-1}$ and 1500 $cm^{-1}$ are due to combinations of bands of pyridine sorbed on both Brønsted and Lewis sites.

For the steamed, composite catalysts made with the zeolites shown in Table 5, Table 6 lists the intensities observed for the bands due to the presence of Brønsted and Lewis sites on the catalysts.

TABLE 6

|  | RECREY | RECREY + ADA I | RECREY + ADA II |
|---|---|---|---|
| Band intensities due to: (abs. units/gram) |  |  |  |
| Brønsted sites | 22 | 33 | 33 |
| Lewis Acid sites | 55 | 104 | 60 |

These results show the effective addition of this metal compound does increase the Lewis acidity of the active catalyst.

Having now fully described this invention, it will be appreciated by those skilled in the art that the invention can be performed within a wide range of parameters within what is claimed:

What is claimed is:

1. A process comprising:

(a) forming a mixture by contacting a crystalline microporous oxide and an aluminum-containing promoter precursor that is stable in the gas phase and capable of forming an aluminum-containing promoter compound, said crystalline microporous oxide comprising a non-framework portion and having a unit cell size; and, (b) heating the mixture of step (a) to a temperature between 150° C. and 550° C., wherein said aluminum-containing promoter compound is incorporated only into the non-framework portion of the crystalline microporous oxide and wherein the unit cell size of the crystalline microporous oxide is not substantially increased.

2. The process according to claim 1 further comprising treating the product of step (b) with an oxygen containing material to remove any residual organic material from the crystalline microporous oxide.

3. The process according to claim 1 further comprising incorporating the product of step (b) into a matrix material.

4. The process according to claim 1 further comprising calcining the crystalline microporous oxide before mixing the crystalline microporous oxide with said aluminum-containing promoter precursor.

5. The process according to claim 1 wherein said crystalline microporous oxide is selected from the group consisting of zeolites, tectosilicates, tetrahedral aluminophosphates, and tetrahedral silicoaluminophosphates.

6. The process according to claim 1 wherein said crystalline microporous oxide is a zeolite and wherein said promoter metal is aluminum.

7. The process according to claim 6 wherein said promoter precursor is aluminum acetylacetonate.

8. The process according to claim 1 wherein said promoter precursor is selected from the group consisting of aluminum acetylacetonate, and aluminum dichlorohydrol.

9. A process comprising:

(a) contacting a calcined crystalline microporous oxide and an aluminum-containing organic promoter precursor that is stable in the gas case and capable of forming a promoter compound, said crystalline microporous oxide comprising a non-framework portion and having a unit cell size; and, (b) activating said promoter compound, wherein said promoter compound is incorporated only into the non-framework portion of the crystalline microporous oxide and wherein the promoter compound does not substantially increase the unit cell size of the crystalline microporous oxide.

10. The process according to claim 9 further comprising removing any residual organic material from the crystalline microporous oxide.

11. The process according to claim 9 further comprising incorporating the product of step (b) into a matrix material.

12. The process according to claim 9 wherein said crystalline microporous oxide is selected from the group consisting of zeolites, tectosilicates, tetrahedral aluminophosphates, and tetrahedral silicoaluminophosphates.

13. The process according to claim 9 wherein said crystalline microporous oxide is a zeolite and said promoter metal is aluminum.

14. The process according to claim 9 wherein said promoter metal compound is activated by contacting the promoter precursor with an oxygen containing material selected from the group consisting of air, oxygen gas, water, and alcohols.

* * * * *